L. V. FULMER.
COASTER BRAKE.
APPLICATION FILED JULY 8, 1911.

1,009,901.

Patented Nov. 28, 1911.

2 SHEETS—SHEET 1.

Witnesses
E. Larson
M. N. Schmidt

Inventor
Lewis V. Fulmer
By Milo S. Thomas
Attorneys

L. V. FULMER.
COASTER BRAKE.
APPLICATION FILED JULY 8, 1911.

1,009,901.

Patented Nov. 28, 1911.

2 SHEETS—SHEET 2.

Witnesses
E. Larson

Inventor
Lewis V. Fulmer
By
Attorneys

UNITED STATES PATENT OFFICE.

LEWIS V. FULMER, OF OWOSSO, MICHIGAN.

COASTER-BRAKE.

1,009,901. Specification of Letters Patent. Patented Nov. 28, 1911.

Application filed July 8, 1911. Serial No. 637,500.

*To all whom it may concern:*

Be it known that I, LEWIS V. FULMER, a citizen of the United States, residing at Owosso, in the county of Shiawassee and State of Michigan, have invented certain new and useful Improvements in Coaster-Brakes, of which the following is a specification.

This invention has for its object to provide a coaster brake embodying certain novel features of construction to be hereinafter described and claimed, whereby slipping is rendered impossible when driving or applying the brake, this result being produced without the use of friction devices, and by a mechanism which operates smoothly and noiselessly, and which is subject to little, if any, wear.

In order that the invention may be better understood, reference is had to the accompanying drawings forming a part of this specification, in which drawings—

Figure 1:
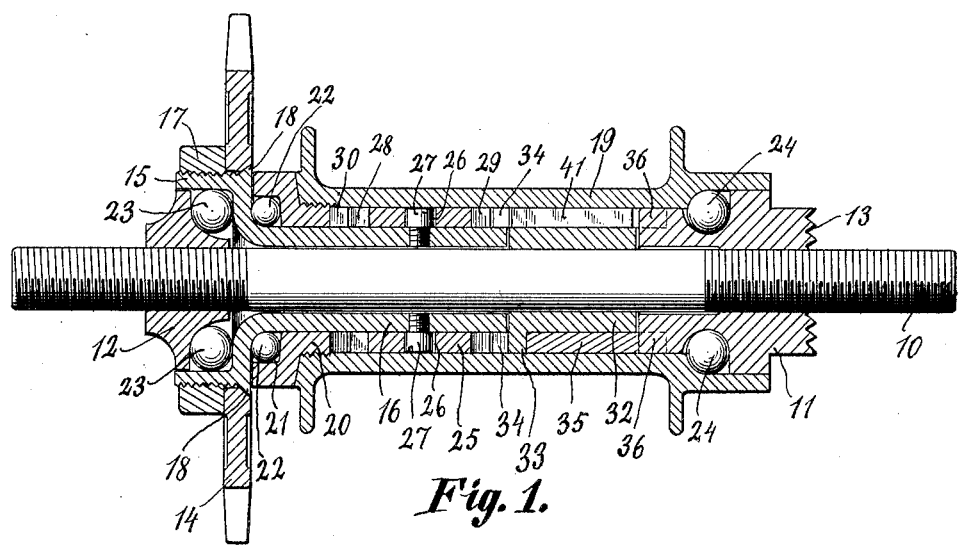
Figure 2:
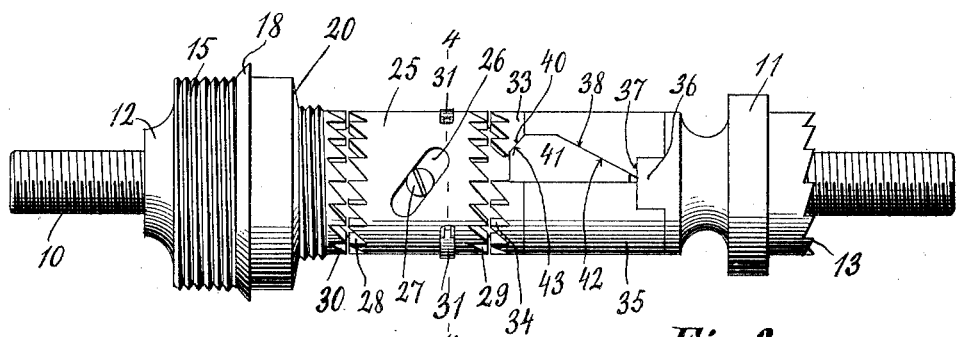
Figure 3:
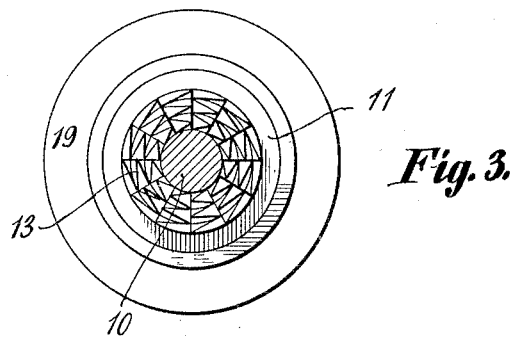
Figure 4:
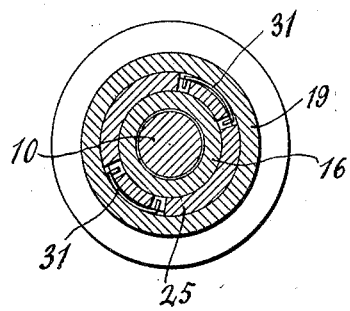
Figure 5:
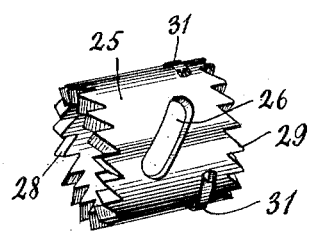
Figure 6:
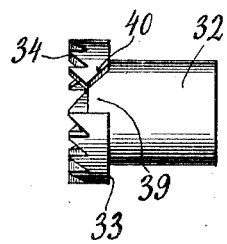
Figure 7:
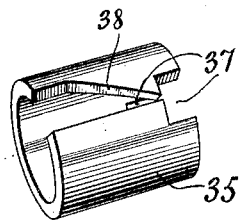
Figure 8:
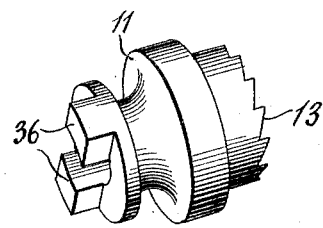

Figure 1 is a central longitudinal section of the mechanism. Fig. 2 is an elevation thereof with the hub removed. Fig. 3 is an end view. Fig. 4 is a cross section on the line 4—4 of Fig. 2. Figs. 5 to 8 are detail views of certain parts of the mechanism removed.

Referring specifically to the drawings, 10 denotes a stationary axle having screw-threaded ends to receive bearings 11 and 12, respectively. The axle is locked to the rear fork of the bicycle in the usual manner. The outer end of the bearing 11 is serrated as indicated at 13, so that a better grip on the fork may be had, the serrations or teeth effectually preventing the bearing from slipping. These serrations are formed by V-shaped annular grooves and intersecting radial notches in the end of the bearing.

A sprocket wheel 14 is located adjacent to the bearing 12, said wheel being carried by a hub 15 having a tubular extension 16 on its inner side through which the axle 10 loosely passes. The other side of the hub is externally threaded to receive a nut 17 which screws against the outer face of the sprocket wheel and serves to clamp the same against an inclined shoulder 18 on the hub, the sprocket wheel being thus held on the hub between the nut and the shoulder. It will be noted that the sprocket wheel is fastened to the hub without being screwed thereon, which latter is objectionable, as the sprocket wheel draws the threads so tightly when in use that it requires considerable effort to unscrew it. It is often necessary to remove the sprocket wheel in order to replace the spokes, and as there is no way of holding the driving member while unscrewing the sprocket wheel, the strain comes upon the brake band and its operating parts, subjecting the same to many times the strain they were intended to withstand, and often breaking them. These objections are entirely obviated by the structure shown. The sprocket wheel can be readily removed upon unscrewing the nut 17, the former being held during this operation so that no strain is put on the working parts of the brake mechanism.

The hub 19 of the wheel is tubular and carries at one of its ends a clutch member 20 which screws thereinto. This member is tubular and the extension 16 of the hub 15 passes loosely therethrough. The outer end of the member 20 is formed with a cup 21 which holds anti-friction balls 22 which are engaged by the inner side of the hub 15, and between the other side of the hub and the bearing 12 are located anti-friction balls 23. The other end of the hub is supported by the bearing 11, anti-friction balls 24 being interposed therebetween.

The inner end of the hub extension 16 projects from the inner end of the clutch member 20 into the bore of the hub 19, and is loosely encircled by a sleeve 25 having diametrically opposite oblique slots 26 into which extend pins 27 carried by the part 16, by reason of which the sleeve is moved to the right in the direction of its length when said part 16 is rotated in one direction, and to the left when rotated in the opposite direction. The ends of the sleeve 25 are formed with clutch teeth 28 and 29, respectively, the former being designed to engage teeth 30 on the member 20 when moved into engagement therewith. With the parts in this position, the motion of the sprocket wheel and its hub is transmitted to the clutch member 20 and through the latter to the hub 19. Upon disengaging the sleeve 25 from the clutch member, the hub 19 runs idle. The sleeve 25 carries a pair of retarders 31, the same comprising bowed springs seating at their ends in recesses made in the sleeve and being, intermediate their ends, in frictional engagement with the inner surface of the hub 19 at diametrically opposite points.

In the bore of the hub 19 is also mounted a brake carrying member comprising a sleeve 32 loosely encircling the axle 10, and located between the inner ends of the sleeve 25 and the bearing 11. That end of the member which is adjacent to the inner end of the sleeve has an annular shoulder 33, and the side of said shoulder which faces the end of the sleeve has clutch teeth 34 which are designed for engagement by the teeth 29 on said end of the sleeve. The sleeve 32 is loosely encircled by a split ring 35 which is located between the shoulder 33 and the inner end of the bearing 11, on which latter are two diametrically opposite lugs 36 which extend into recesses 37 in the adjacent end of the ring, whereby the latter is held against rotary movement. In order that the ring may expand so as to come in frictional engagement with the inner surface of the hub 19, and thus act as a brake, said ring is split longitudinally in line with one of the recesses 37. One end of the ring formed by thus dividing the ring is inclined as indicated at 38. The shoulder 33 has a recess 39 which is in line with the split portion of the ring, and on the same side of the recess as the incline 38, the wall of said recess has an incline 40, said incline being in the opposite direction from the first-mentioned incline. Between the ends of the ring is mounted a wedge 41 for expanding the same to effect the braking action. The wedge also extends into the recess 39, and one of its inner edges has oppositely extending inclines 42 and 43, respectively, to fit the inclines 38 and 40. A double wedge is thus had, the purpose of which will be presently described.

The operation of the mechanism is as follows: When the hub extension 16 turns forward, the pins 27 cause the sleeve 25 to move toward the clutch member 20, and the teeth of said parts are locked, thus giving a driving connection between the sprocket wheel 14 and the hub 19. The slots 26 are so designed that the pins 27 are always in the end thereof when the teeth are interlocked, and there is no end thrust produced. The sleeve has both a rotary and a longitudinal movement toward the clutch member which causes the teeth to engage smoothly, eliminating all danger of the teeth breaking or catching, and insuring a quiet operation. Owing to this movement, the teeth are always fully engaged, and the pins are in the end of the slots before the driving pressure is brought to bear on these parts. It is apparent that there can be no wear on the pins, slots, or teeth when engaged, and owing to the manner in which the teeth engage each other, no effort is required to effect their engagement or release. The effort needed to move the sleeve endwise is so small that there is practically no wear on the slots or pins. There is no wear on the teeth whatever owing to their shape and the manner in which they come together. The tendency of the retarders 31 is to turn the sleeve 25 as fast as the hub 19, in view of which the part 16 must turn faster than the hub before the sleeve will move toward the clutch member 20. This produces the rotary and endwise movement before mentioned. When the hub 19 is not turning (as when the bicycle is standing still), and the sprocket wheels turn forward, the friction of the retarders against the hub is not great enough to prevent the sleeve from turning, but it is sufficient to cause said sleeve 25 to turn slower than the hub extension 16; otherwise, the rotary and endwise movement would not occur under this condition. The pins working in the slots have a tendency to turn the sleeve, and if the retarders pressed against the hub hard enough to overcome this, the sleeve would move against the clutch member 20 without any rotary movement (when the hub is stationary), and the teeth therefore might not engage as they should. If the retarders did not have sufficient resistance to cause the sleeve to turn slower than the hub extension, said sleeve would not move endwise. The friction of the retarders is very slight and there is no appreciable resistance to the turning of the wheel when coasting. This arrangement is a decided improvement over coaster brakes in which the retarders are attached to some non-revolving part of the mechanism and act on that part of the mechanism which is actuated by the screw, and as this part turns when driving, the retarders offer constant resistance to the turning of the wheel. In the present construction, the retarders revolve with the hub when driving, and there is no action of the retarders as they move with the hub. To coast, the sprocket wheel is rotated backward sufficiently to disengage the sleeve 25 from the clutch member 20, whereupon the hub 19 is disconnected from the sprocket wheel and runs idle. When coasting, or at any other time that the hub turns faster than the sprocket wheel, the action of the retarders 31 causes the sleeve 25 to move against the sleeve 32, the pins of the teeth of said parts coming in contact before the pins 27 reach the ends of the slots 26. This prevents the retarders from having any tendency to turn the sprocket wheel.

To apply the brake, the sprocket wheel is rotated backward until the pins 27 move the sleeve 25 a sufficient distance toward the sleeve 32 so as to engage the teeth 29 with the teeth 34, and thus lock said parts together. The sleeve 32 now turns with the sleeve 25. As the sleeve 32 commences to turn, the incline 40, by its engagement with the incline 43, pushes the wedge 41 lengthwise toward the right, whereupon the ring 35 is caused to expand by the action of the inclines 38 and 42, and as the ring expands it comes into frictional engagement with the inner surface of the hub 19 and thus serves as a brake. When the ring is expanded, as stated, one of the edges of the recesses 37, by its engagement with the lugs 36, holds the ring against rotation. The hub turning toward the opposite edges of the recesses assists the expansion of the brake ring and makes the brake self-applying, although always under the control of the wedge. The lugs 36 fit loosely in the recesses 37. When the backward pressure on the sleeve 32 is removed, the wedge is pushed to the left by the contraction of the ring, the latter being tempered steel and having sufficient resiliency to effect this, thereby turning the sleeve back to its place and holding it there. This feature of the brake makes it operate very easily.

By the structure herein described, the sprocket wheel is positively locked to the hub when driving and when turned backward it is positively locked to the parts which operate the brake, and it is impossible for the parts to slip when driving or applying the brake. These results are produced without the use of a friction drive, and are accomplished with a mechanism that operates smoothly and noiselessly, and is subject to little, if any, wear. The mechanism will operate in heavy grease or thin oil, equally well in hot or cold weather, and it will also operate with little or no oil. While the parts are subject to very little wear, a considerable amount of wear would not affect their operation.

I claim:

1. The combination of a hub, a driving member therefor, a non-rotatable expansible split brake ring in the hub, a rotatable carrier for the brake ring, a wedge between the ends of the ring for expanding the same, means for coupling the driving member to the brake ring carrier, and means actuated by the rotation of the brake ring carrier for advancing the wedge to expand the brake ring.

2. The combination of a hub, a driving member therefor, a non-rotatable expansible split brake ring in the hub, a rotatable carrier for the brake ring, said carrier having a recess which is in line with the space between the ends of the ring, an expander for the ring comprising a double wedge located between the ends of the ring and extending into the aforesaid recess, and means for coupling the driving member to the brake ring carrier to advance the wedge to expand the brake ring, the wedge being thus actuated by the engagement of one of the walls of the recess therewith.

3. The combination of a hub, a driving member thereof, a non-rotatable expansible split brake ring in the hub, a rotatable carrier for the brake ring, said carrier having a circumferential shoulder provided with a recess which is in line with the space of the ring, an expander for the ring comprising a double wedge located between the ends of the ring and extending into the aforesaid recess, and means for coupling the driving member to the brake ring carrier to advance the wedge to expand the brake ring, the wedge being thus actuated by the engagement of one of the walls of the recess therewith.

4. The combination of a hub, a driving member therefor, a longitudinally movable sleeve having clutch teeth on one of its ends, a non-rotatable expansible split brake ring in the hub, a rotatable carrier for the brake ring, said carrier having clutch teeth in one of its ends which are opposite to the clutch teeth of the sleeve, means operated by the driving member for advancing the sleeve toward the brake ring carrier to engage the clutch teeth, and a wedge between the ends of the ring for expanding the same, said wedge being actuated by the rotation of the brake ring carrier.

5. The combination of a hub, a driving member therefor carrying outstanding pins, a sleeve slidable lengthwise on the driving member, said sleeve having oblique slots into which the aforesaid pins extend, and one end of the sleeve being formed with clutch teeth, a non-rotatable expansible split brake ring in the hub, a rotatable carrier for the brake ring, said carrier being provided with clutch teeth which are opposite the clutch teeth of the sleeve, and a wedge between the ends of the ring for expanding the same, said wedge being actuated by the rotation of the brake ring carrier.

6. The combination of a hub, a clutch member fixed thereto, a driving member carrying outstanding pins, a sleeve loosely mounted on that portion of the driving member which carries the pins, said sleeve having oblique slots into which the pins extend, and being provided with means for interlocking with the aforesaid clutch member, and a retarder carried by the sleeve and in frictional engagement with the hub.

7. The combination of a hub, a driving member therefor, a clutch member fixed to the hub, a clutch member coöperating therewith, the last-mentioned clutch member being slidably mounted on the driving member, means actuated by the driving member for locking the clutch members together, and a retarder carried by the second-mentioned clutch member and in frictional contact with the hub.

In testimony whereof I affix my signature in presence of two witnesses.

LEWIS V. FULMER.

Witnesses:
 Roy M. Chrouch,
 Warren Pierpont.

Copies of this patent may be obtained for five cents each, by addressing the "Commissioner of Patents, Washington, D. C."